United States Patent
Hiramoto et al.

(10) Patent No.: US 7,104,390 B2
(45) Date of Patent: Sep. 12, 2006

(54) CONVEYING APPARATUS FOR SPOUTS OR BAGS WITH SPOUTS

(75) Inventors: Shinichi Hiramoto, Iwakuni (JP); Kakue Nakamoto, Iwakuni (JP); Masakazu Setozaki, Iwakuni (JP)

(73) Assignee: Toyo Jidoki Co., Ltd., Tokyo (JP)

( * ) Notice: Subject to any disclaimer, the term of this patent is extended or adjusted under 35 U.S.C. 154(b) by 18 days.

(21) Appl. No.: 10/391,384

(22) Filed: Mar. 18, 2003

(65) Prior Publication Data

US 2003/0173186 A1 Sep. 18, 2003

(30) Foreign Application Priority Data

Mar. 18, 2002 (JP) .................................. 2002-073395

(51) Int. Cl.
*B65G 47/86* (2006.01)

(52) U.S. Cl. ................. 198/480.1; 198/468.1; 198/466.1; 198/803.7

(58) Field of Classification Search ............. 198/466.1, 198/468.1, 478.1, 479.1, 480.1, 481.1, 803.7, 198/459.2
See application file for complete search history.

(56) References Cited

U.S. PATENT DOCUMENTS

| | | | | |
|---|---|---|---|---|
| 4,114,347 A | * | 9/1978 | Morris et al. ................. 53/300 |
| 4,388,989 A | * | 6/1983 | Edmunds et al. ........ 198/346.2 |
| 6,474,919 B1 | * | 11/2002 | Wallace et al. ............. 411/301 |
| 6,488,449 B1 | * | 12/2002 | Laquay et al. ................ 406/88 |
| 6,692,050 B1 | * | 2/2004 | Graffin ....................... 294/104 |

FOREIGN PATENT DOCUMENTS

| | | |
|---|---|---|
| JP | 6-16229 | 1/1994 |
| JP | 2001-315715 | 11/2001 |
| WO | WO 0142113 A1 * | 6/2001 |

\* cited by examiner

*Primary Examiner*—Eileen D. Lillis
*Assistant Examiner*—Mark A. Deuble
(74) *Attorney, Agent, or Firm*—Koda & Androlia

(57) ABSTRACT

A conveying apparatus for spouts or bags with spouts thereon, including: a circular rotating body which is driven rotationally, a guide rail disposed around the circumference of the rotating body with a predetermined spacing in between, and a plurality of grippers disposed on the rotating body and rotated with the rotating body. The rotating body has an outer circumferential edge that supports the flanges of the spouts, and the guide rail has on its inner edge an arc-shaped guide portion that also supports the flanges of the spouts. During the rotation of the rotating body, the grippers close to hold the spouts at the flanges and then opens to release the spouts. A rotational force is imparted by the rotating body to the spouts while spouts are held at the flanges by the grippers.

5 Claims, 4 Drawing Sheets

CONVEYING APPARATUS FOR SPOUTS OR BAGS WITH SPOUTS

BACKGROUND OF THE INVENTION

1. Field of the Invention

The present invention relates to a conveying apparatus which receives spouts or bags having spouts thereon that are conveyed in a single row along guide rails and transfers the spouts or bags to subsequent guide rails after changing the conveying direction.

2. Prior Art

When conveying spouts or bags provided with spouts thereon in a single row along guide rails and then supplying such spouts or bags to an apparatus for manufacturing bags having spouts or to a filling apparatus, etc., it may be necessary to change the direction of conveying during the conveying process because of various devices installed and because of space limitations, etc.

A conveying and supplying apparatus which is used to change the conveying direction at right angles at an intermediate point in the conveying process when bags with spouts thereon are conveyed along guide rails is described in Japanese Patent Application Laid-Open. (Kokai) No. 2001-315715.

This conveying and supplying apparatus includes a conveying screw, a swingable lever and a feed-out device. The conveying screw is disposed on the upstream side of an intersection point and rotates intermittently by a single revolution at a time, so that bags with spouts that are fed out one at a time are stopped and positioned in the intersection point (i.e., waiting position). The swingable lever is disposed in the intersection point and supports the flanges of the stopped spouts so that the spouts are prevented from falling. The feed-out device in this conveying and supplying apparatus is disposed on the downstream side of the intersection point so as to move parallel to the guide rails, and it catches the stopped spouts in the intersection point with a push-out body that is free to protrude and conveys the spouts downstream along downstream-side guide rails.

Furthermore, Japanese Patent Application Laid-Open (Kokai) No. 6-16229 discloses a container conveying apparatus that changes the conveying direction of containers by 90 degrees (this apparatus does not relate to spouts or bags that have spouts). This container conveying apparatus has a conveying screw and a guide which are disposed along a curved track. The neck of each container is supported between these two elements, and the containers are conveyed along the curved track by way of causing the conveying screw to rotate.

In the conveying and supplying apparatus of the above-described Japanese Patent Application Laid-Open (Kokai) No. 2001-315715, bags with spouts that have been conveyed in a concentrated state or irregular manner along guide rails are arranged in a regular fashion by the conveying screw that is disposed before the intersection point and are at the same time temporarily stopped and positioned in the intersection point. After which these positioned bags are conveyed along the guide rails on the downstream side by a pushing body that makes a reciprocating motion. Accordingly, not only is the timing control of the rotation of the conveying screw and the movement of the pushing body complicated, but the overall conveying capacity is limited due to the intersection point. Furthermore, when the bags are fed out from the intersection point, the lever rubs against the head portions of the spouts (head portions being the portion on the spouts where the caps are attached); as a result, there is a danger that the head portions are damaged, so that a complete sealing is not formed on the caps.

Meanwhile, in the case of the container conveying apparatus described in the above-described Japanese Patent Application Laid-Open (Kokai) No. 6-16229, it is essential to use a conveying screw that is bent 90 degrees. Accordingly, this is merely a disclosure of an idea.

SUMMARY OF THE INVENTION

The present invention was made to solve the problems with conventional apparatuses.

It is an object of the present invention to provide a conveying apparatus for spouts or bags with spouts, in which any regular arrangement or positioning is not required when spouts or bags are conveyed in a single row along guide rails and the conveying direction is changed at an intermediate point in the conveying process.

It is another object of the present invention to provide a conveying apparatus for spouts or bags in which complicated timing control is not required, conveying capacity is not particularly restricted, and any damage to the head portions of the spouts is assuredly avoided.

The above objects are accomplished by a unique structure for a conveying apparatus for spouts or bags with spouts in which the conveying apparatus receives spouts or bags that are conveyed in a single row along linear guide rails and then changes the direction of conveying so as to transfer the spouts or bags to subsequent guide rails; and in the present invention, the conveying apparatus includes:

- a circular rotating body which is driven rotationally,
- an guide rail which is disposed around the circumference of the rotating body with a predetermined spacing in between, and
- a plurality of grippers which are disposed on the rotating body and rotated together with the rotating body; and
- the rotating body has an outer circumferential edge portion that enters into the groove portions formed between flanges of the spouts and thus supports the flanges,
- the guide rail has, on its inner side, a circular arc form guide portion that enters into the groove portions formed between flanges of the spouts and thus supports the flanges, and
- the grippers have spout holding portions that open and close in a vertical direction at a predetermined timing as the rotating body is rotated, the spout holding portions being lowered onto the outer circumferential edge portion when the spout holding portions are closed.

In the above structure, when the spout holding portion of a gripper is lowered, if the flange(s) of a spout(s) happens to be present in this location, then the flange(s) is held between the spout holding portion and the outer circumferential edge portion of the rotating body; and in this state, the spout(s) is conveyed as the rotating body is rotated. The spouts not held between the outer circumferential edge portion and the spout holding portion are pushed by the spout holding portion lowered behind such spouts or the spouts that are held by the spout holding portion, so that the spouts are conveyed in the direction of rotation of the rotating body.

In the circular arc form guide portion of the guide rail of the above-described conveying apparatus, for example, a guide projection that supports the flanges of the spouts from below is provided along the direction of length on the upper surface of the guide portion of the guide rail. On the guide rail side, only this guide projection contacts the flanges of the spouts. Thus, the contact area is reduced compared to a case in which the guide portion is planar, and the sliding movement of the spouts becomes smooth.

Furthermore, for example, the width (i.e., the width viewed in the circumferential direction of the rotating body) of the spout holding portions of the grippers of the above-described conveying apparatus is set so as to be greater than the width of the flanges of the spouts. As a result, the probability that the flanges of some spout are held by the spout holding portions is high.

In the above-described conveying apparatus,
  the grippers are disposed radially at equal intervals on the rotating body, and
  each one of the grippers is:
    pivotally supported at its intermediate point on a supporting shaft that is disposed horizontally on the rotating body, and
    constantly driven by a compression spring that is disposed between the gripper and the rotating body and on the center side of the rotating body with respect to the supporting shaft, and
    the spout holding portion of the gripper is caused to move up and down by a cam that is disposed in the predetermined position above the rotating body.

The opening and closing of the grippers are set at preferred timing. In any case, this timing is set: so that the grippers close at a position where one side of the flange of each spout ("one side" being the side that becomes the inner side when the spout is on the circumference of the circular rotating body) which is on the linear (feed-in) guide rails is completely transferred from the linear (feed-in) guide rails to the outer circumferential edge portion of the rotating body or in a position located following this position, and so that the grippers open at a position where the flange begins to be transferred to the next linear (feed-out) guide rails or in a position located before such a position.

DETAILED DESCRIPTION OF THE INVENTION

The conveying apparatus of the present invention will be described below in detail with reference to FIGS. 1 through 4.

Figure 1:
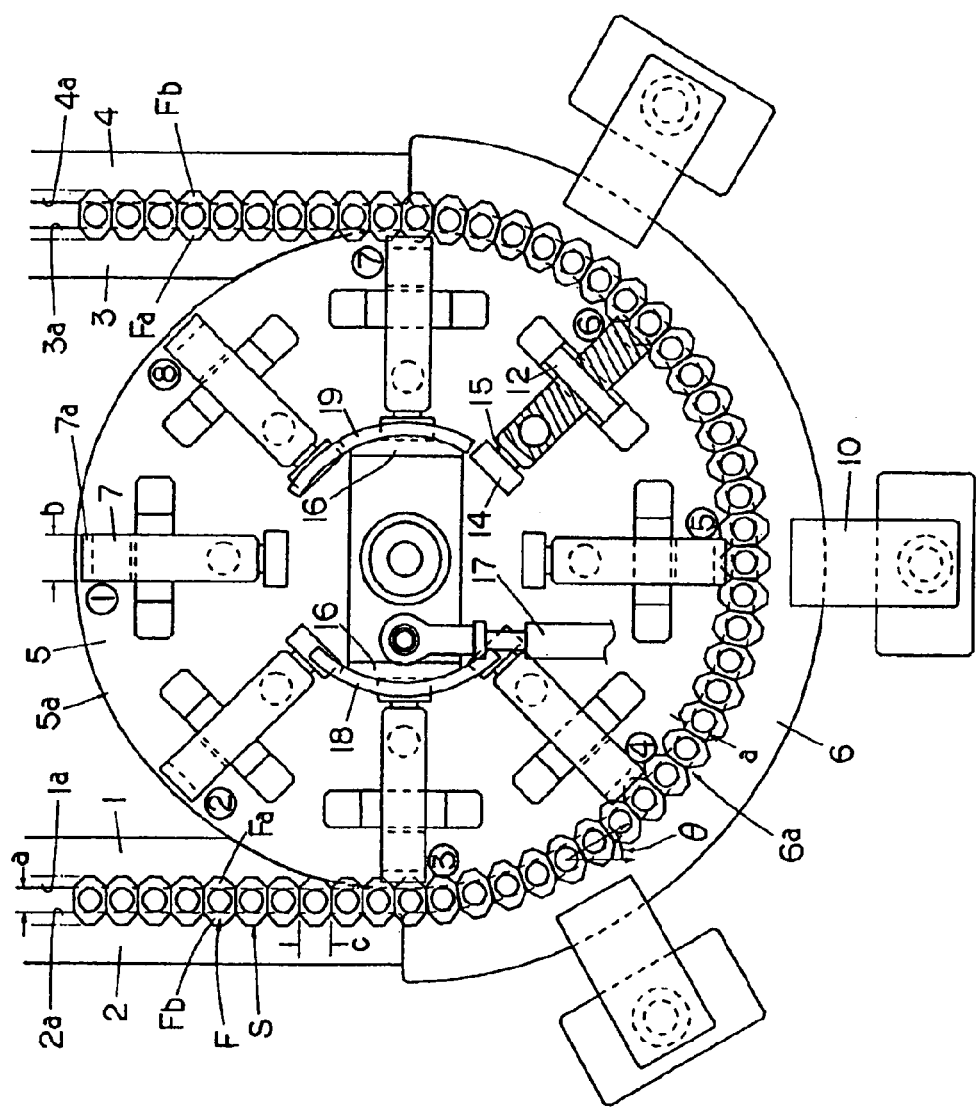
FIG. 1 is a partially sectional top view of the conveying apparatus according to the present invention.
Figure 2:
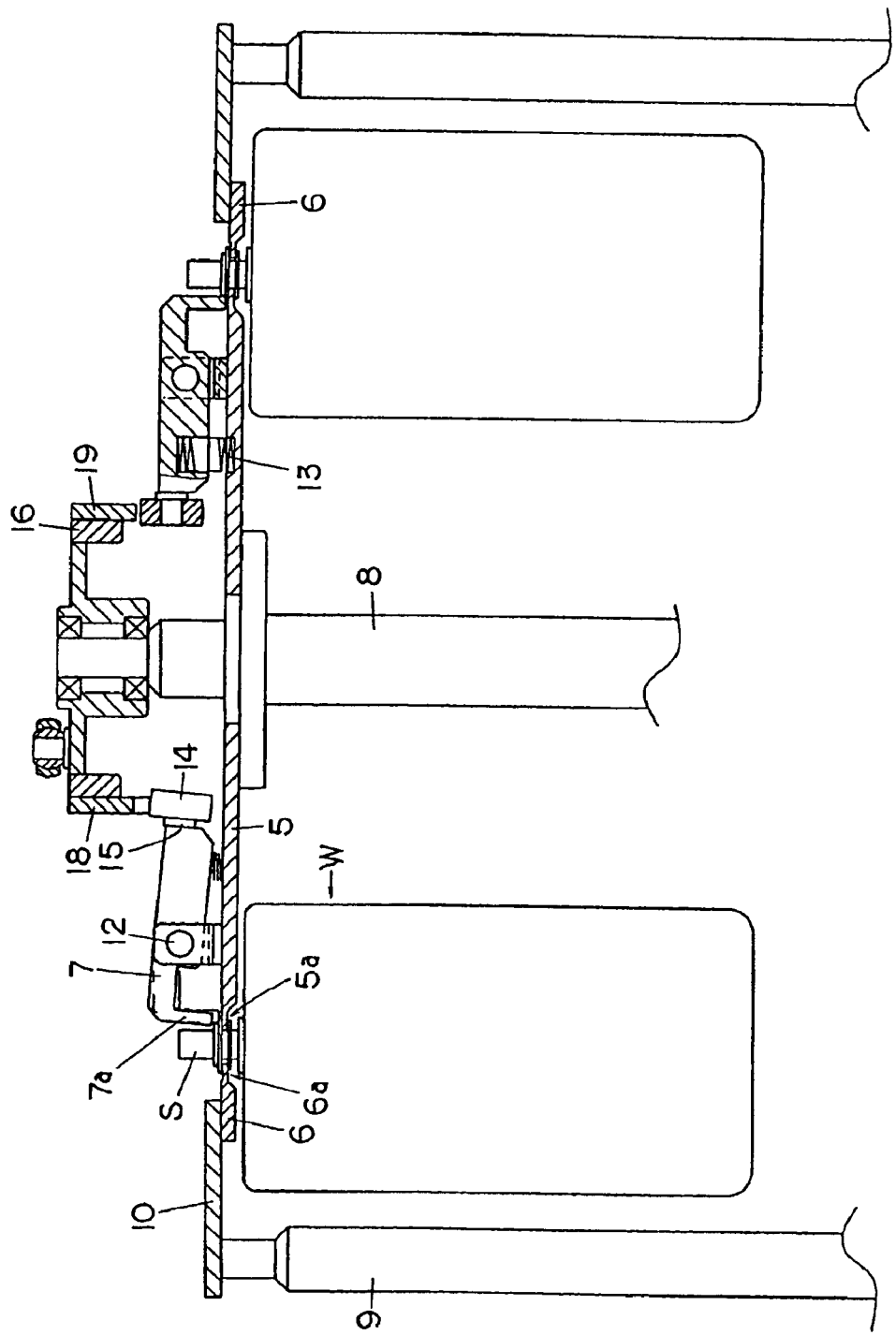
FIG. 2 is a sectional front view thereof.
Figure 3:
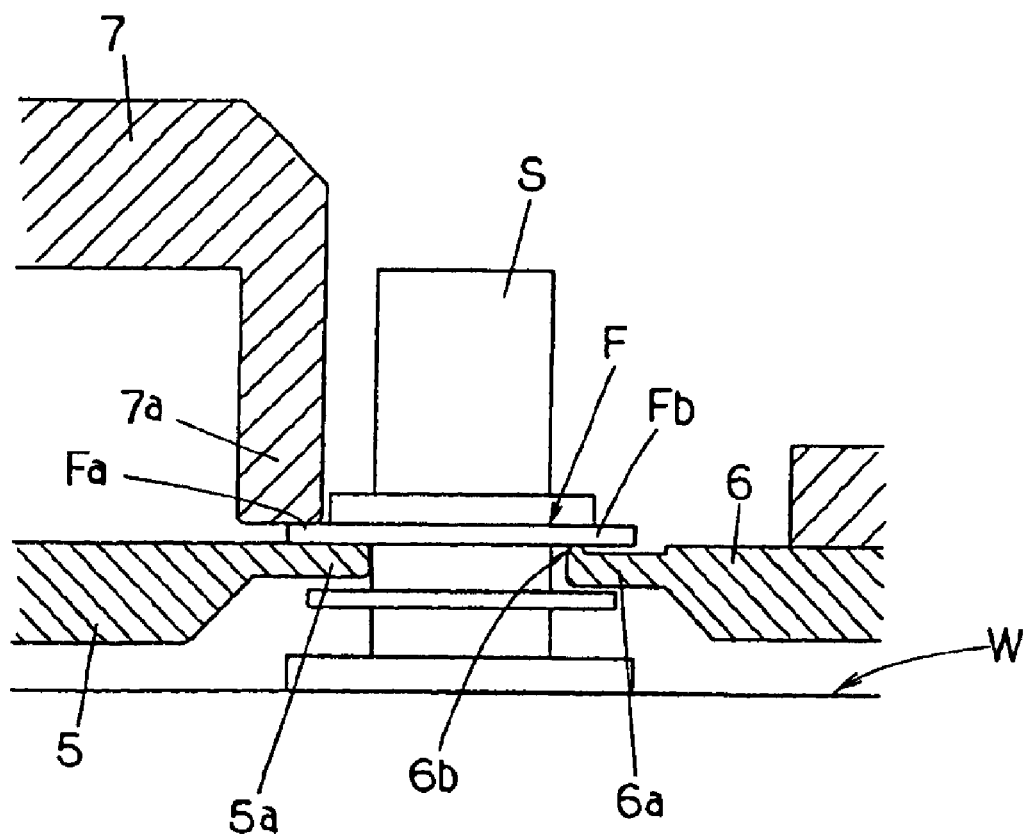
FIG. 3 is a sectional side view of an area in the vicinity of the spout supporting portions.

The conveying apparatus shown in FIGS. 1 and 2 is an apparatus that transfers spouts S, and it also can transfer bags W which are respectively attached with spouts. The spouts S or bags W are conveyed along a pair of linear guide rails (feed-in guide rails) 1 and 2 disposed side by side to another pair of linear guide rails (feed-out guide rails) 3 and 4 disposed side by side. The conveying direction of the guide rails 1 and 2 differs by 180 degrees from the conveying direction of the guide rails 3 and 4.

The conveying apparatus includes a circular rotating body 5 which is rotationally driven continuously, a guide rail 6 which is disposed around the circumference of the rotating body 5 with a predetermined spacing in between, and a plurality of grippers 7 which are disposed on the rotating body 5 and rotated with the rotating body 5. FIG. 1 shows a case in which the bags W with spouts are conveyed in a concentrated state.

The guide rails 1 and 2 are disposed at a spacing that has a predetermined width, and guide rails 3 and 4 are also disposed at a spacing that has a predetermined width. Guide portions 1a and 1b of the guide rails 1 and 2 and guide portions 3a and 4a of the guide rails 3 and 4 which run along the insides of these guide rails engage with a gap formed between flanges F of each one of the spouts S, so that the flange are supported from the sides, and so that the conveyance of the spouts is guided. This is a known structure.

The rotating body 5 is fastened to a drive shaft 8 which is connected to a driving source (not shown) so that the drive shaft 8 rotates continuously. The rotating body 5 is formed with a thinner outer circumferential edge portion 5a that has a flat upper surface. The outer circumferential edge portion 5a, as best seen from FIG. 3, enters into the groove portion located between (two) flanges F of the spouts S and supports one side (the side on the inner side of rotation, i.e., Fa) of each flange F.

The guide rails 1 and 2 and guide rails 3 and 4, which are straight or linear rails, are disposed in more or less tangential directions with respect to the rotating body 5 as seen from FIG. 1. The front end of the guide rail 1 which is closer to (the center of) the rotating body 5 of the two guide rails 1 and 2 is cut away in a circular arc shape; and likewise the rear end of the guide rail 3 which is closer to (the center of) the rotating body 5 of the two guide rails 3 and 4 is also cut away in a circular arc shape. Thus, these circular arc shaped ends of the rails 1 and 4 are disposed so that they face the outer circumference of the rotating body 5 with an extremely slight gap in between; and the guide portions 1a and 3a of the guide rails 1 and 3 are disposed so as to be tangential to the outer circumferential edge portion 5a of the rotating body 5.

The guide rail 6 is fastened to attachment plates 10 which are disposed on the upper end of a stand 9 and is disposed around the circumference of the rotating body 5 over a range of approximately 180 degrees. There is a gap a between the guide rail 6 and the rotating body 5. The guide rail 6 has a circular arc form guide portion 6a which runs along the inside (the side adjacent to the rotating body 5) of the guide rail 6. The guide portion 6a is provided so as to enter into the groove portions between the flanges F of the spouts S and supports the other side (the side on the outer side of rotation, i.e., Fb) of each flange F.

A guide projection 6b (see FIG. 3) which supports the flanges F of the spouts S from below is formed along the direction of length on the upper surface of the guide portion 6a. The rear end of the guide rail 6 is connected to the front end of the guide rail 2 which is further from (the center of) the rotating body 5 of the two guide rails 1 and 2; and the front end of the guide rail 6 is connect to the rear end of the guide rail 4 which is further from (the center of) the rotating body 5 of the two guide rails 3 and 4. In addition, the guide portion 6a is connected to the guide portions 2a and 4a of the guide rails 2 and 4.

Eight grippers 7 are disposed radially at 45-degree intervals on the rotating body 5. Each gripper 7 has a spout holding portion 7a on the front end (the outer end in the radial direction) which faces the rotating body 5 in a substantially vertical attitude. The width b (see FIG. 1) of the spout holding portion 7a (i.e., the width as seen in the circumferential direction of the rotating body 5) is set so that the width is larger (wider) than the width c of the flanges F of the spouts S.

The grippers 7 are respectively supported at an intermediate point thereof on the supporting shafts 12 that are disposed horizontally on the rotating body 5 so that the grippers 7 are free to pivot about the supporting shafts 12. The grippers 7 are constantly driven by compression springs 13 that are disposed between the grippers 7 and the rotating body 5 on the rear sides (or the rotating body's center side) of the supporting shafts 12. Accordingly, if there is no action of the cams 18 and 19 (described later), the grippers 7 are in a closed state, so that the spout holding portions 7a of the grippers 7 are in the lowered position on the outer circumferential edge portion 5a of the rotating body 5 and contact either the upper surface of the outer circumferential edge portion 5a (when no spouts are present) or the upper surfaces of the flanges F of the spouts S (when the spouts are present).

On the rear end of each gripper 7, a cam roller 14 is attached to a supporting shaft 15. The axial center of the supporting shaft 15 is oriented in the radial direction (of the rotating body 5), and the roller 14 is rotatably provided on the supporting shaft 15. Furthermore, a cam attachment member 16 is attached to the upper end of the drive shaft 8 so that relative rotation between these two elements is possible; and this cam attachment member 16 is connected to a fixed stand (not shown) via a connecting rod 17 and is positioned so that no rotation is made.

Two circular arc form cams 18 and 19 (see FIG. 1) are fastened to the cam attachment member 16 so that the cams 18 and 19 are respectively located on the upstream side and on the downstream side with respect to the conveying direction of the spouts S. The circular arc form cams 18 and 19 have downward-facing cam surfaces. Thus, as the rotating body 5 is rotated, the cam rollers 14 make a following rotation over the cam surfaces of the circular arc form cams 18 and 19, so that the grippers 7 open and close. In other words, each gripper 7 pivots about the supporting shaft 12, so that the spout holding portion 7a at the front end is moved up (open) and moved down (close). The positions of the cams 18 and 19 in the circumferential direction can be adjusted by adjusting the length of the connecting rod 17, and in this way the timing of the opening and closing of the grippers 7 can be adjusted.

In the conveying apparatus describe above, the opening and closing timing of each of the grippers is set as follows:

(1) When the gripper 7 is at position ①, the gripper 7 is closed.
(2) Before position ②, the cam roller 14 of the gripper 7 comes into contact with the cam surface of the cam 18 and begins to be lowered (i.e., the gripper 7 begins to open); from around the time that position ② is passed through, the cam surface of the cam 18 is formed horizontal, and thus the gripper 7 is kept in the most opened state.
(3) When the gripper 7 is at position ④, the cam roller 4 of the gripper disengages from the cam surface of the cam 18, and the gripper 7 is closed (so that the flange F of the spout S, if present, is held between the gripper 7 and the rotating body 5 (see FIG. 3)).
(4) Before position ⑦, the cam roller 14 of the gripper 7 comes into contact with the cam surface of the cam 19 and begins to be lowered, so that the gripper 7 begins to open (in cases where the gripper 7 holds the spout S at its flange F, the spout S (flange F) is released).
(5) Near a point before position ⑧, the cam surface of the cam 19 is formed horizontal; and at around the time that the gripper 7 passes the position ⑧, the cam roller 14 of the gripper 7 disengages from the cam surface of the cam 19, and the gripper 7 is closed.

Next, the transfer of bags W, which are attached with spouts S, by the above conveying apparatus will be described in terms of a time sequence.

(1) The spouts S of the bags W on the guide rails 1 and 2 are conveyed in a concentrated state by being pushed (by spouts) from behind (upper side in FIG. 1) and are introduced into the conveying apparatus in this concentrated state. In this case, as seen from FIG. 3, one side (inner side) Fa of the flange F of each spout S is transferred onto the outer circumferential edge portion 5a of the rotating body 5 at position ③; then, the other side (outer side) Fb of the flange F is transferred onto the guide portion 6a of the guide rail 6.
(2) Since the flanges F of the transferred spouts S ride on the outer circumferential edge portion 5a of the rotating body 5, which is continuously rotating, and on the guide projection 6b, which has a small contact area, the spouts S are pushed by the following spouts, so that the spouts are rotationally conveyed in a smooth manner while the rotational angle θ (i.e., the angle between the direction of the guide rails 1 and 2 and the conveying direction) is small.
(3) When this rotational angle θ becomes larger, it is difficult to say that the conveying is smooth. However, prior to this (when the spouts reach position ④), the grippers 7 close so that the inner side Fa of the flange F (of the spout S) riding on the outer circumferential edge portion 5a is held by the spout holding portion 7a (or, specifically, held between the spout holding portion 7a and the outer circumferential edge portion 5a of the rotating body 5). A rotational force is imparted by the rotating body 5 to this spout S thus held, so that there is an action that pushes the spouts which are concentrated on the forward side of the thus held spout S out in the forward direction. As a result of this rotational force, the rotational conveying of the spouts is performed in a smooth manner regardless of the rotational angle θ.
(4) Prior to the completion of the change in direction (in concrete terms, prior to the arrival of the spout S at position ⑦, the gripper 7 begin to open, and the spout S is released from the spout holding portion 7a.
(5) Next, the outer side Fb of the flange F of the spout S is transferred onto the guide portion 4a of the guide rail 4, and the inner side Fa of the flange F of the spout S is transferred onto the guide portion 3a of the guide rail 3. Following this transfer onto the guide rails 3 and 4 as well, the spout S is pushed together with and by the following spouts so that the spouts are conveyed forward in a concentrated state.

Figure 4:
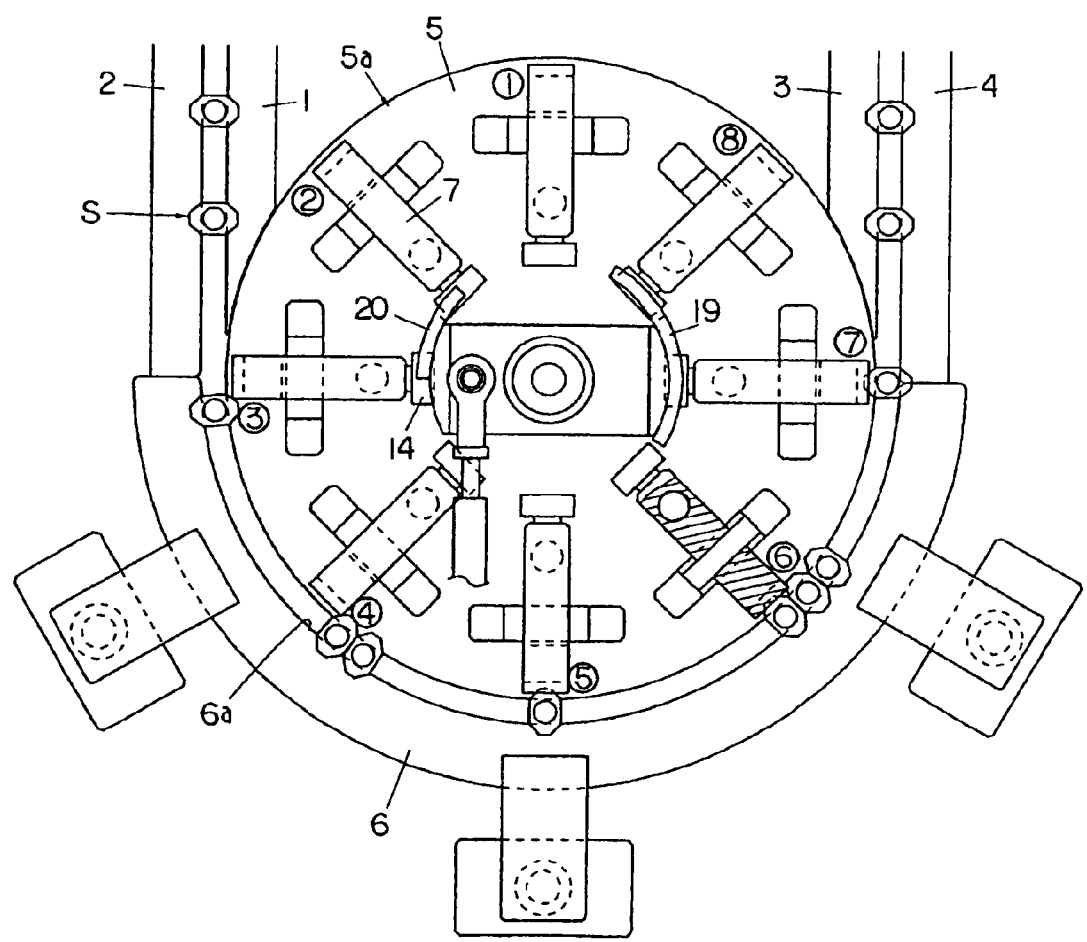
FIG. 4 is a partially sectional top view of the conveying apparatus according to the present invention, being different from one shown in FIG. 1 in terms of the cam provided.

FIG. 4 shows a case in which bags W with spouts S thereon are conveyed over the guide rails 1 and 2 in an irregular manner or at spaced intervals (the conveying apparatus itself is the same as that shown in FIG. 1, except for the fact that a cam 20 is installed instead of the cam 18). Even in cases where the bags are conveyed in a concentrated state, conveying of bags become irregularly in some cases.

When spout S are conveyed in an irregular manner or at spaced intervals, in order to ensure that a rotational force is immediately imparted by the rotating body to the spouts S that are transferred onto the outer circumferential edge portion 5a of the rotating body 5 and the guide portion 6a of the guide rail 6, in the structure of FIG. 4, it is designed so that at position ③ the cam rollers 14 of the grippers 7 disengage the cam 20 so that the grippers 7 close.

Thus, if the flange F of a spout S is present below when the gripper 7 closes, this flange F is held by the gripper 7 (or more specifically held between the spout holding portion 7a of the gripper 7 and the outer circumferential edge portion 5a of the rotating body 5), so that a rotational force is imparted by the rotating body 5 to the spout S. Furthermore, even in cases where no flange F of a spout S is present below the gripper 7 when the gripper 7 closes, the spout holding portion 7a of the closed gripper 7 pushes the flange F of the spout S located immediately ahead, so that a rotational force is likewise imparted to this spout S. The larger the spout holding portions 7a is in width, the higher the probability that the flange F of some spout S is held.

In the conveying apparatus described above, the guide rail 2 and the guide rail 6 are separate bodies, and the guide rail 6 and the guide rail 4 are also separate bodies. However, these guide rails can be formed in an integral fashion. Moreover, some other system than described above can be used for the grippers. For example, the spout holding portions of the grippers can be opened and closed in the vertical direction by means of air cylinders.

As seen from the above, according to the conveying apparatus of the present invention, spouts or bags with spouts are conveyed in a single row along (linear) guide rails (in one direction) are received, the direction in which the spouts or bags are conveyed is changed via a (curved) rotational track, and then the spouts or bags are smoothly transferred to subsequent guide rails (in another direction). In the present invention, it is sufficient that a gripper holds the flange of some spouts that have been conveyed. Moreover, a rotational force is imparted by the rotating body to the spouts regardless of where the flange is held or even when the flange is not held. Accordingly, there is no need for regular arrangement or positioning of the spouts on the (linear) guide rails. Consequently, there is no need for complicated timing control, and the overall conveying capacity is not limited by the change in the conveying direction. Furthermore, since only the flanges of the spouts are held, faulty sealing caused by damage to the head portions of the spouts can be avoided.

What is claimed is:

1. A conveying apparatus for spouts or bags with spouts, wherein said conveying apparatus receives said spouts or bags with spouts that are conveyed in a single row along guide rails and changes direction of conveying so as to transfer said spouts or bags with spouts to subsequent guide rails, said conveying apparatus comprising:
    a circular rotating body which is driven rotationally, an outer circumferential edge portion of said circular rotating body being in a circular shape,
    a guide rail which is disposed around a circumference of said rotating body with a predetermined spacing in between, and
    a plurality of grippers which are disposed on said rotating body and are rotated together with said rotating body, wherein:
    said rotating body has an outer circumferential edge portion that enters into groove portions between flanges of said spouts and thus supports said flanges,
    said guide rail has on an inner side thereof a circular arc form guide portion that enters into groove portions between flanges of said spouts and thus support said flanges, and
    said grippers have spout holding portions that open and close in a vertical direction at a predetermined timing as said rotating body is rotated, said spout holding portions being lowered onto said outer circumferential edge portion when said spout holding portions are closed.

2. The conveying apparatus according to claim 1, wherein a guide projection that supports said flanges of said spouts from below is provided along a direction of length on an upper surface of said guide portion of said guide rail.

3. The conveying apparatus according to claim 1 or 2, wherein a width of said spout holding portions of said grippers is set so as to be greater than a width of said flanges of said spouts.

4. The conveying apparatus according to claim 1 or 2, wherein
    said grippers are disposed radially at equal intervals on said rotating body, and
    each of said grippers is:
        pivotally supported at intermediate point thereof on a supporting shaft that is disposed horizontally on said rotating body, and
        constantly driven by a compression spring that is disposed between said each of said grippers and said rotating body and is on a center side of said rotating body with respect to said supporting shaft, and
        a spout holding portion of said each of said grippers is caused to move up and down by a cam that is disposed in a predetermined position above said rotating body.

5. The conveying apparatus according to claim 3, wherein said grippers are disposed radially at equal intervals on said rotating body, and
    each of said grippers is:
        pivotally supported at intermediate point thereof on a supporting shaft that is disposed horizontally on said rotating body, and
        constantly driven by a compression spring that is disposed between said each of said grippers and said rotating body and is on a center side of said rotating body with respect to said supporting shaft, and
        a spout holding portion of said each of said grippers is caused to move up and down by a cam that is disposed in a predetermined position above said rotating body.

* * * * *